US010968811B2

(12) United States Patent
Lee

(10) Patent No.: US 10,968,811 B2
(45) Date of Patent: Apr. 6, 2021

(54) COOLANT FLOW CONTROL APPARATUS, COOLING SYSTEM PROVIDED WITH THE SAME AND CONTROL METHOD FOR THE SAME

(71) Applicants: Hyundai Motor Company, Seoul (KR); Kia Motors Corporation, Seoul (KR)

(72) Inventor: Hyo Jo Lee, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 264 days.

(21) Appl. No.: 16/193,257

(22) Filed: Nov. 16, 2018

(65) Prior Publication Data

US 2020/0040802 A1 Feb. 6, 2020

(30) Foreign Application Priority Data

Jul. 31, 2018 (KR) .................. 10-2018-0089319

(51) Int. Cl.
*F01P 7/16* (2006.01)
*F01P 3/02* (2006.01)

(52) U.S. Cl.
CPC .................. *F01P 7/16* (2013.01); *F01P 3/02* (2013.01); *F01P 2003/027* (2013.01); *F01P 2031/16* (2013.01)

(58) Field of Classification Search
CPC .. F01P 7/16; F01P 3/02; F01P 2031/16; F01P 2003/027; F01P 7/165; F01P 2025/62; F01P 2025/66; F01P 2060/04; F01P 2025/42; F01P 2025/40; F01P 5/12; F01P 2007/146; F01P 11/16; F01P 2050/22
See application file for complete search history.

(56) References Cited

U.S. PATENT DOCUMENTS

| 3,907,199 | A | * | 9/1975 | Kreger | F01P 7/167 237/12.3 B |
| 5,183,012 | A | * | 2/1993 | Saur | F01P 7/167 123/41.08 |
| 5,427,062 | A | * | 6/1995 | Chamot | F01P 7/16 123/41.1 |
| 5,676,308 | A | * | 10/1997 | Saur | F01P 7/167 236/34.5 |

(Continued)

FOREIGN PATENT DOCUMENTS

JP 2660771 B2 10/1997

*Primary Examiner* — Hung Q Nguyen
(74) *Attorney, Agent, or Firm* — Morgan, Lewis & Bockius LLP

(57) ABSTRACT

A coolant flow control apparatus may include a coolant controller housing of which an inlet for coolant to flow in, an outlet for the coolant to flow out, a first coolant supply line and a second coolant supply line are formed, a water pump mounted to the coolant controller housing for transmitting the coolant, a valve plate selectively opening/closing the first coolant supply line, a valve piston selectively opening/closing the second coolant supply line, a driving unit selectively moving the valve plate and the valve piston for closing or opening the first coolant supply line and the second coolant supply line respectively and a controller configured for controlling an operation of the driving unit.

17 Claims, 9 Drawing Sheets

(56) References Cited

U.S. PATENT DOCUMENTS

| | | | |
|---|---|---|---|
| 6,843,209 B2* | 1/2005 | Miyagawa | F01P 5/10 123/41.1 |
| 2002/0007806 A1* | 1/2002 | Chamot | F01P 7/167 123/41.1 |
| 2002/0096130 A1* | 7/2002 | Fishman | F01P 7/167 123/41.1 |
| 2005/0001045 A1* | 1/2005 | Bouloy | F01P 7/165 236/101 R |
| 2005/0268866 A1* | 12/2005 | Finkbeiner | F01P 7/167 123/41.1 |

* cited by examiner

COOLANT FLOW CONTROL APPARATUS, COOLING SYSTEM PROVIDED WITH THE SAME AND CONTROL METHOD FOR THE SAME

CROSS-REFERENCE TO RELATED APPLICATION

The present application claims priority to Korean Patent Application No. 10-2018-0089319 filed on Jul. 31, 2018, the entire contents of which is incorporated herein for all purposes by this reference.

BACKGROUND OF THE INVENTION

Field of the Invention

The present invention relates to a coolant flow control apparatus, a cooling system provided with the same and a control method for the same which may reduce warm-up timing and enhance cooling efficiency.

Description of Related Art

An engine discharges thermal energy while generating torque based on combustion of fuel, and a coolant absorbs thermal energy while circulating through an engine, a heater, and a radiator, and releases the thermal energy to the outside.

When a temperature of the coolant of the engine is low, viscosity of oil may increase to increase frictional force and fuel consumption, and a temperature of an exhaust gas may increase gradually to lengthen a time for a catalyst to be activated, which degrades quality of the exhaust gas. Furthermore, as a time required for a function of the heater to be normalized is increased, a driver may feel discomfort.

When the coolant temperature is excessively high, since knocking occurs, performance of the engine may deteriorate by adjusting ignition timing to suppress the knocking. Furthermore, when a temperature of lubricant is excessively high, a viscosity is lowered such that a lubrication performance may be deteriorated.

For enhance fuel consumption performance, heating performance and cooling performance, a variable water pump, an electric thermostat, a coolant flow control valve and the like are applied to a cooling system. However, layout of a cooling system has complicated and manufacturing cost has been increased.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a coolant flow control apparatus, a cooling system provided with the same and a control method for the same having advantages of reducing warm-up time and enhancing cooling efficiency with simple structure.

A coolant flow control apparatus according to exemplary embodiments of the present invention may include a coolant controller housing of which an inlet for coolant to flow in, an outlet for the coolant to flow out, a first coolant supply line and a second coolant supply line are formed, a water pump mounted to the coolant controller housing for transmitting the coolant, a valve plate selectively opening/closing the first coolant supply line, a valve piston selectively opening/closing the second coolant supply line, a driving unit selectively moving the valve plate and the valve piston for closing or opening the first coolant supply line and the second coolant supply line respectively and a controller configured for controlling an operation of the driving unit.

A guiding wall of which the valve piston is movably disposed therewithin may be formed at the coolant controller housing.

The water pump may be a mechanical water pump.

The water pump may be an electric water pump, and the controller may be configured to control an operation of the electric water pump.

The driving unit may include a thermostat housing connected to the valve plate and the valve piston and of which wax is filled with, a spring elastically supporting the thermostat housing, a guide rod guiding a movement of the thermostat housing and an electric heater transmitting heat to the wax through the guide rod.

The driving unit may include an operating rod connected to the valve plate and the valve piston, a spring elastically supporting the operating rod and a solenoid connected to the operating rod and selectively moving the operating rod.

A cooling system according to exemplary embodiments of the present invention may include an engine including an upper cylinder head, an upper line transmitting coolant to the upper cylinder head, a lower cylinder head connected to the upper cylinder head, a lower line transmitting coolant to the lower cylinder head, an engine block connected to the lower cylinder head and a block line transmitting coolant to the engine block, a plurality of heat exchange elements receiving coolant from the lower cylinder head, a radiator receiving coolant from the upper cylinder head and the engine block, a coolant controller housing of which an inlet receiving coolant from the plurality of heat exchange elements and the radiator, an outlet communicating with the lower line, a first coolant supply line communicating with the upper line and a second coolant supply line communicating with the block line are formed, a water pump mounted to the coolant controller housing for transmitting the coolant, a valve plate selectively opening/closing the first coolant supply line, a valve piston selectively opening/closing the second coolant supply line, a driving unit selectively moving the valve plate and the valve piston for closing or opening the first coolant supply line and the second coolant supply line respectively, a vehicle operation state detecting portion including a first coolant temperature sensor detecting a temperature of coolant in the lower cylinder head and outputting a corresponding signal and a second coolant temperature sensor detecting a temperature of coolant in the engine block and outputting a corresponding signal and a controller configured for controlling an operation of the driving unit according to the output signals of the vehicle operation state detecting portion.

A guiding wall of which the valve piston is movably disposed therewithin may be formed at the coolant controller housing.

The water pump may be a mechanical water pump.

The water pump may be an electric water pump, and the controller may be configured to control an operation of the electric water pump.

The driving unit may include a thermostat housing connected to the valve plate and the valve piston and of which wax is filled with, a spring elastically supporting the thermostat housing, a guide rod guiding a movement of the thermostat housing and an electric heater transmitting heat to the wax through the guide rod.

The driving unit may include an operating rod connected to the valve plate and the valve piston, a spring elastically supporting the operating rod and a solenoid connected to the operating rod and selectively moving the operating rod.

A control method may be applied to the cooling system according to the exemplary embodiments of the present invention.

The control method may include determining, by the controller, whether the outputting signal of the second coolant temperature sensor satisfy a predetermined cold driving condition and controlling, by the controller, operations of the driving unit to close the first coolant supply line and the second coolant supply line.

The control method may further include determining, by the controller, whether the outputting signal of the first coolant temperature sensor satisfy a predetermined warm driving condition and controlling, by the controller, operations of the driving unit to open the first coolant supply line and to close the second coolant supply line.

The control method may further include determining, by the controller, whether the outputting signal of the second coolant temperature sensor satisfy a predetermined high temperature driving condition and controlling, by the controller, operations of the driving unit to open the first coolant supply line the second coolant supply line.

The coolant flow control apparatus, the cooling system provided with the same and the control method for the same according to the exemplary embodiments of the present invention may reduce warm-up time and enhance cooling efficiency with simple structure.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
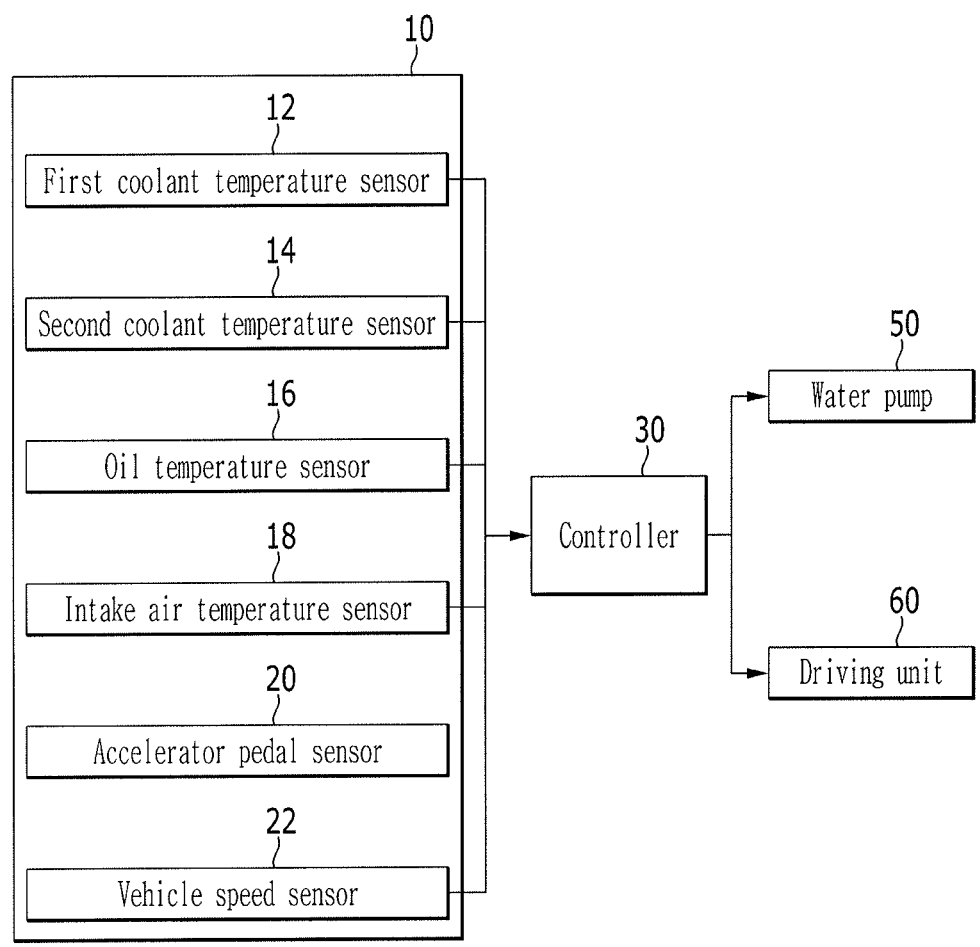
FIG. 1 is a block diagram of a cooling system according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In the following detailed description, only certain exemplary embodiments of the present invention have been shown and described, simply by way of illustration.

The sizes and thicknesses of the configurations shown in the drawings are provided selectively for the convenience of description, such that the present invention is not limited to those shown in the drawings and the thicknesses are exaggerated to make some parts and regions clear.

However, parts irrelevant to the description will be omitted to clearly describe the exemplary embodiments of the present invention, and the same or similar constituent elements will be designated by the same reference numerals throughout the specification.

In the following description, names of constituent elements are classified as a first . . . , a second . . . , and the like to discriminate the constituent elements having the same name, and the names are not necessarily limited to the order.

Figure 2:
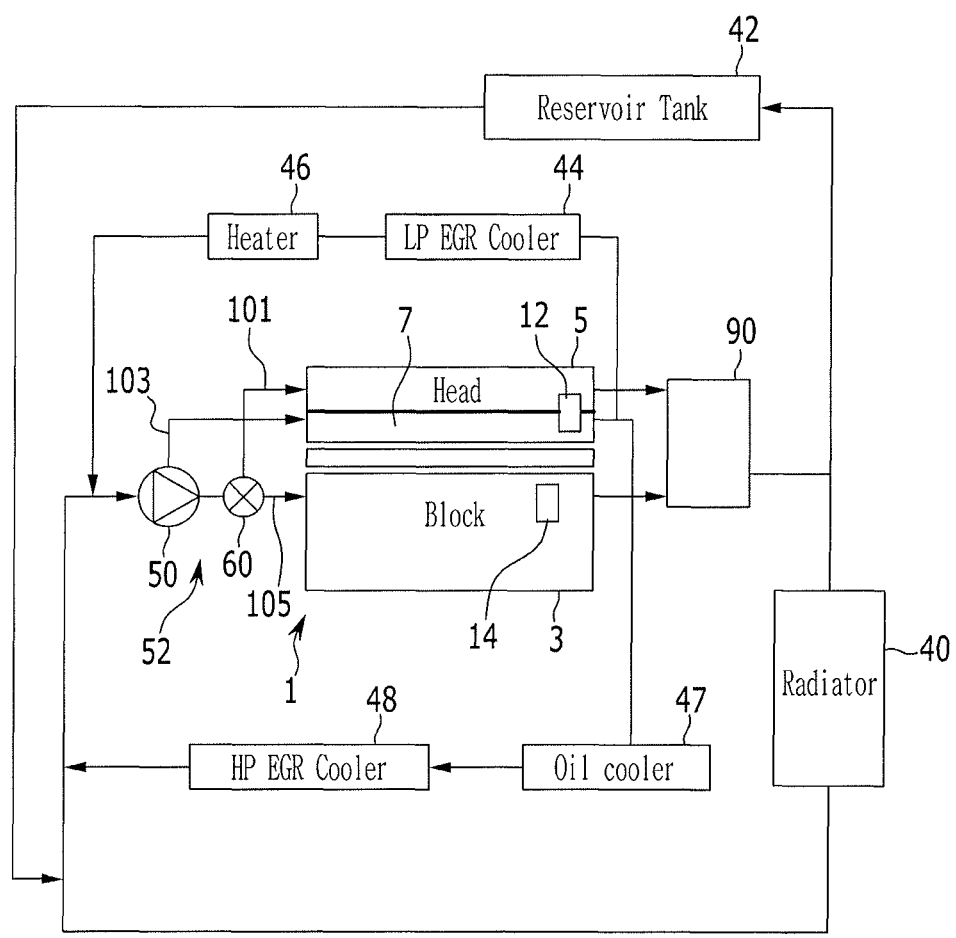
FIG. 2 is a schematic diagram of a cooling system according to an exemplary embodiment of the present invention.

FIG. 1 is a block diagram of a cooling system according to an exemplary embodiment of the present invention and FIG. 2 is a schematic diagram of a cooling system according to an exemplary embodiment of the present invention.

Referring to FIG. 1 and FIG. 2, a cooling system according to an exemplary embodiment of the present invention includes a vehicle operation state detecting portion 10, a driving unit 60 and a controller 30 controlling an operation of the driving unit 60 according to output signals of the vehicle operation state detecting portion 10.

The vehicle operation state detecting portion 10 includes a first coolant temperature sensor 12, a second coolant temperature sensor 14, an oil temperature sensor 16 detecting a temperature of engine oil and outputting a corresponding signal, an intake air temperature sensor 18 detecting a temperature of intake air and outputting a corresponding signal, and accelerator pedal sensor 20 detecting an operation angle of an accelerator pedal and outputting a corresponding signal and a vehicle speed sensor 22 detecting a speed of a vehicle and outputting a corresponding signal.

The controller 30 may be implemented as one or more microprocessors operating by a predetermined program, and the predetermined program may include a series of commands for performing the exemplary embodiment of the present invention.

The cooling system according to an exemplary embodiment of the present invention includes an engine 1 and the engine 1 includes an upper cylinder head 5, an upper line 101 transmitting coolant to the upper cylinder head 5, a lower cylinder head 7 connected to the upper cylinder head 5, a lower line 103 transmitting coolant to the lower cylinder head 7, an engine block 3 connected to the lower cylinder head 7 and a block line 105 transmitting coolant to the engine block 3.

The first coolant temperature sensor 12 is configured for detecting a temperature of coolant in the lower cylinder head 7 and outputting a corresponding signal and the second coolant temperature sensor 14 is configured for detecting a temperature of coolant in the engine block 3 and outputting a corresponding signal.

The cooling system includes a plurality of heat exchange elements receiving coolant from the lower cylinder head 7 and a radiator 40 receiving coolant from the upper cylinder head 5 and the engine block 3.

The plurality of heat exchange elements includes an LP-EGR cooler 44, a heater 46, an oil cooler 47 and an HP-EGR cooler 48. and a reservoir tank 42 may receive a portion of coolant flowing to the radiator 40. But it is not limited thereto shown in drawing. On the other hand, various elements exchanging heat with the coolant may be applied.

Figure 3:
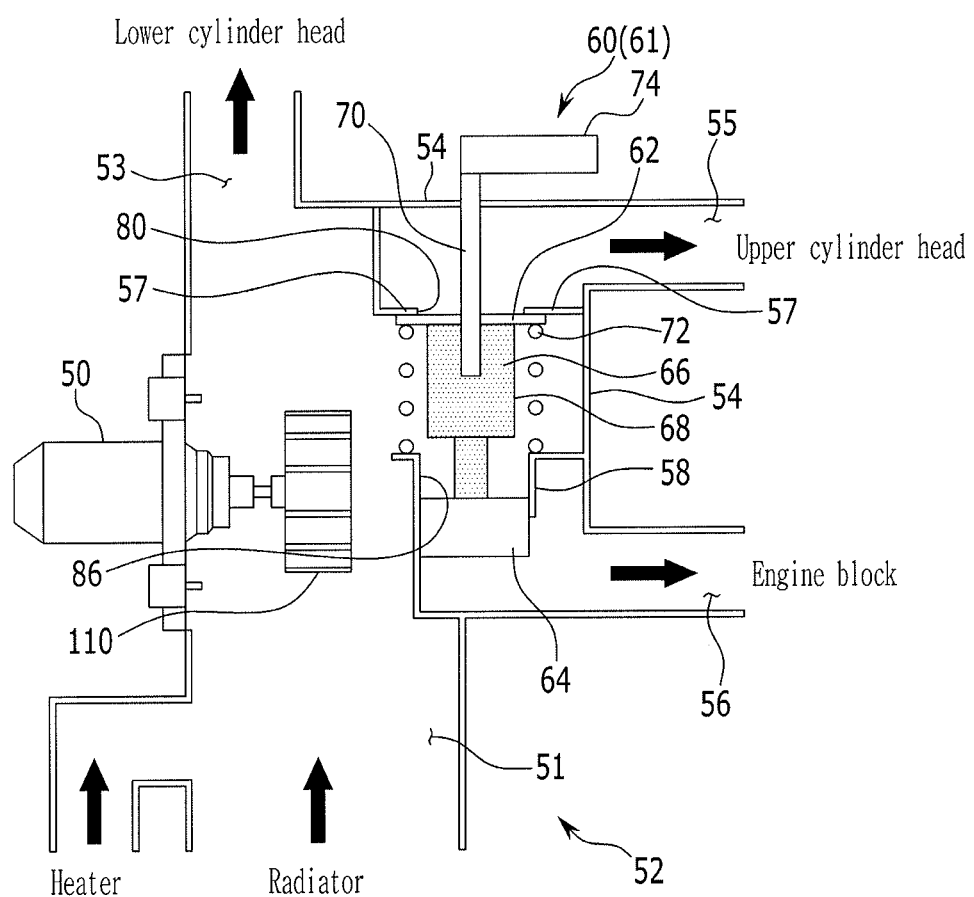
FIG. 3 is a drawing showing an operation of a coolant flow control apparatus in a cold driving condition according to an exemplary embodiment of the present invention.

FIG. 3 is a drawing showing an operation of a coolant flow control apparatus in a cold driving condition according to an exemplary embodiment of the present invention.

Referring to FIG. 2 and FIG. 3, the cooling system includes a coolant flow control apparatus 52.

The coolant flow control apparatus 52 includes a coolant controller housing 54 of which an inlet 51 receiving coolant from the plurality of heat exchange elements and the radiator 40, an outlet 53 communicating with the lower line 103, a first coolant supply line 55 communicating with the upper line 101 and a second coolant supply line 56 communicating with the block line 105 are formed, a water pump 50 mounted to the coolant controller housing 54 for transmitting the coolant, a valve plate 62 selectively opening/closing the first coolant supply line 55, a valve piston 64 selectively opening/closing the second coolant supply line 56 and a driving unit 60 selectively moving the valve plate 62 and the valve piston 64 for closing or opening the first coolant supply line 55 and the second coolant supply line 56 respectively.

The coolant may flow from the inlet 51 to the outlet 53, the first coolant supply line 55 and the second coolant supply line 56 according to a rotation of a blade 110 of the water pump 50.

The coolant supplied from the coolant flow control apparatus 52 is transmitted to the engine 1 and transmitted to the radiator 40 and the plurality of heat exchange elements through an outlet 90 and then flows into the coolant flow control apparatus 52.

As shown in FIG. 2 and FIG. 3, since a cylinder head is separated to the upper cylinder head 5 and the lower cylinder head 7 and the coolant also supplied separated thus cooling efficiency of the engine 1 may be improved. That is, the coolant constantly flows directly from the outlet 53 to the lower cylinder head 7 adjacent to a combustion chamber so that knocking may be prevented. and cooling efficiency of the engine 1 may be improved because the coolant may be selectively supplied to the engine block 3 and the upper cylinder head 5.

A guiding wall 58 of which the valve piston 64 is movably disposed within an opening 85 is formed at the coolant controller housing 54.

The water pump 50 may be a mechanical water pump or an electric water pump.

If the water pump 50 is the electric water pump, the controller 30 may control an operation of the electric water pump so that flowing amount of the coolant may be controlled.

The driving unit 60 may be an electric thermostat 61.

That is, the driving unit 60 includes a thermostat housing 68 connected to the valve plate 62 and the valve piston 64 and of which wax 66 is filled with, a spring 72 elastically supporting the thermostat housing 68, a guide rod 70 guiding a movement of the thermostat housing 68 and an electric heater 74 transmitting heat to the wax 66 through the guide rod 70.

In an exemplary embodiment of the present invention, the guide rod 70 is slidably connected to the valve plate 62 to which a first side of the thermostat housing 68 is fixed, wherein a second side of the thermostat housing 68 is fixed to the valve piston 64.

The controller 30 controls an operation of the electric heater 74 according to the output signals of the vehicle operation state detecting portion. If the wax 66 is expanded according to the control of the controller 30, the valve plate 62 and the valve piston 64 is moved.

A partition 57 extends from the coolant controller housing 54 to form an opening 80 and selectively closes the first coolant supply line 55 when the valve plate 62 contacts the partition 57 to close the opening 80.

In an exemplary embodiment of the present invention, the guiding rod 70 is positioned through the opening 80.

Figure 4:
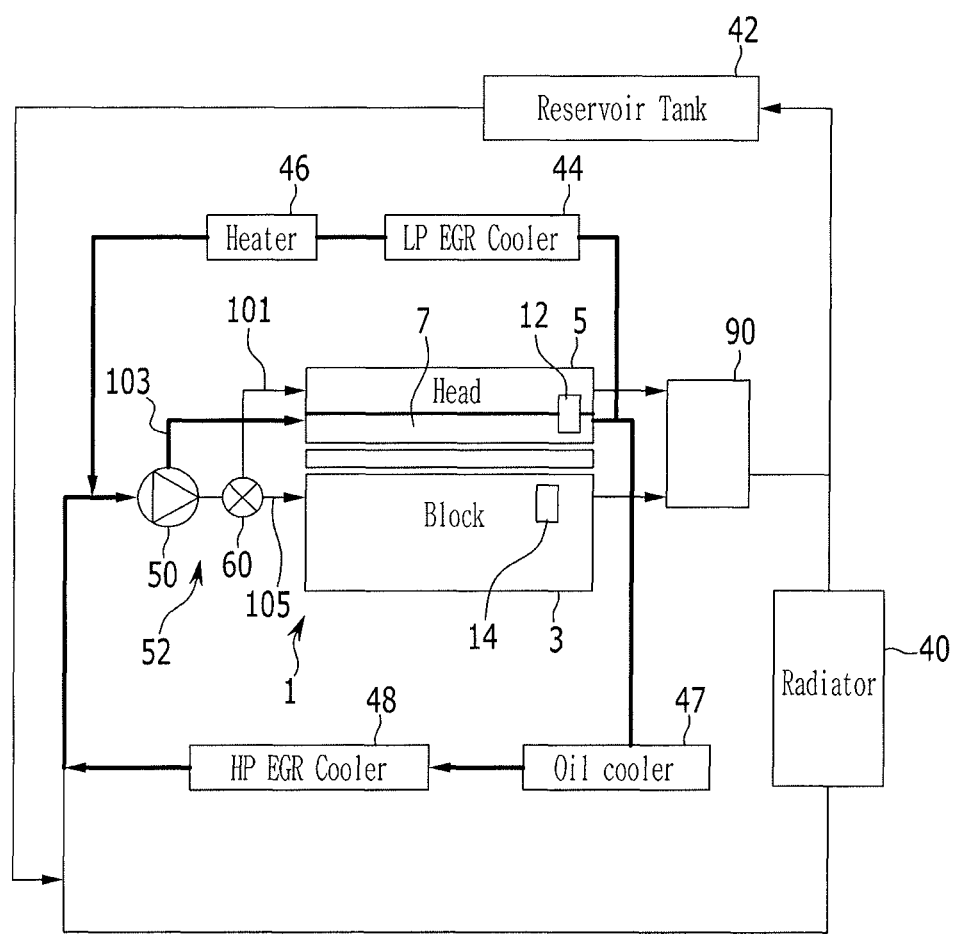
FIG. 4 is a drawing showing an operation of a cooling system in a cold driving condition according to an exemplary embodiment of the present invention.

FIG. 4 is a drawing showing an operation of a cooling system in a cold driving condition according to an exemplary embodiment of the present invention.

Referring to FIG. 3 and FIG. 4, operations of the cooling system according to exemplary embodiments of the present invention in a cold driving condition will be described.

The controller 30 determines whether the outputting signal of the second coolant temperature sensor 14 satisfy a predetermined cold driving condition and if the cold driving condition is satisfied, then the controller 30 controls operations of the driving unit 60 to close the first coolant supply line 55 and the second coolant supply line 56.

The predetermined cold driving condition may be preset as the temperature in the engine block 3 is less than 50° C. and also, it may be preset as a predetermined time from the engine 1 starts.

In the cold driving condition the first coolant supply line 55 and the second coolant supply line 56 are closed so that entire flowing of the coolant stops and warm-up timing of the engine 1 may be decreased.

Meanwhile, the coolant flows to the lower cylinder head 7 through the outlet 53 and the lower line 103 and then the coolant may flow to the oil cooler 47 from the lower cylinder head 7. So that oil temperature may be raised fast in the cold driving condition.

Figure 5:
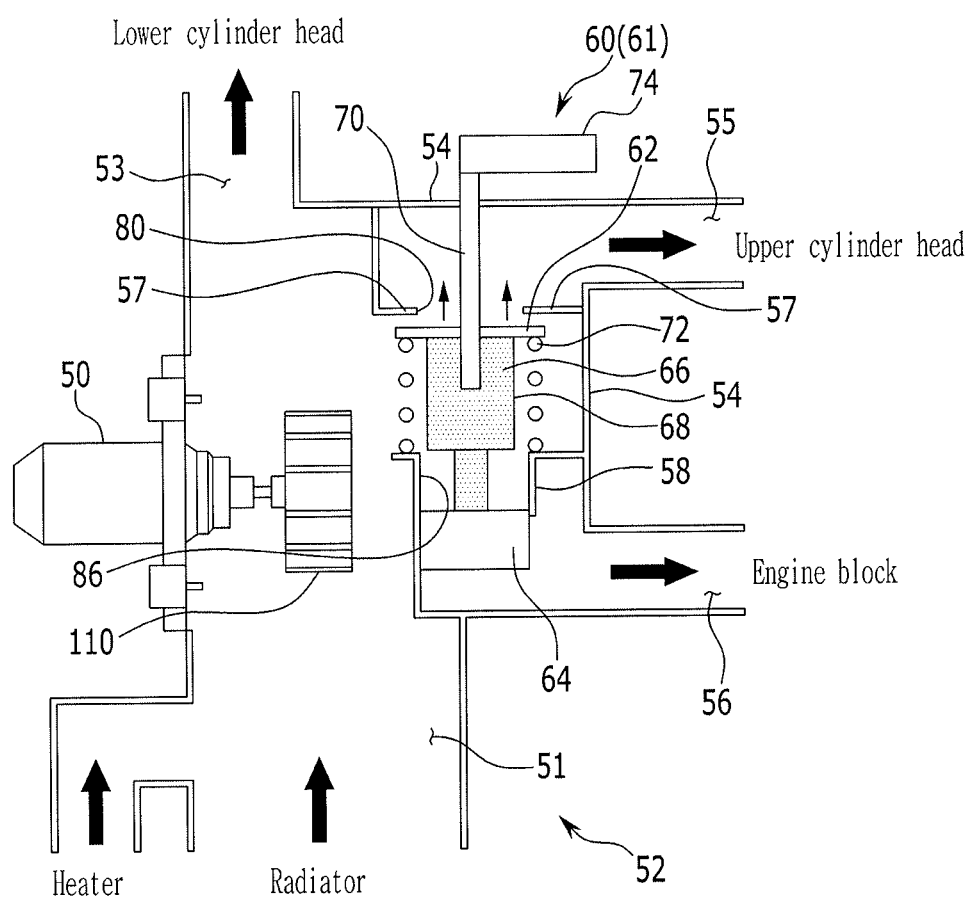
FIG. 5 is a drawing showing an operation of a coolant flow control apparatus in a warm driving condition according to an exemplary embodiment of the present invention.
Figure 6:
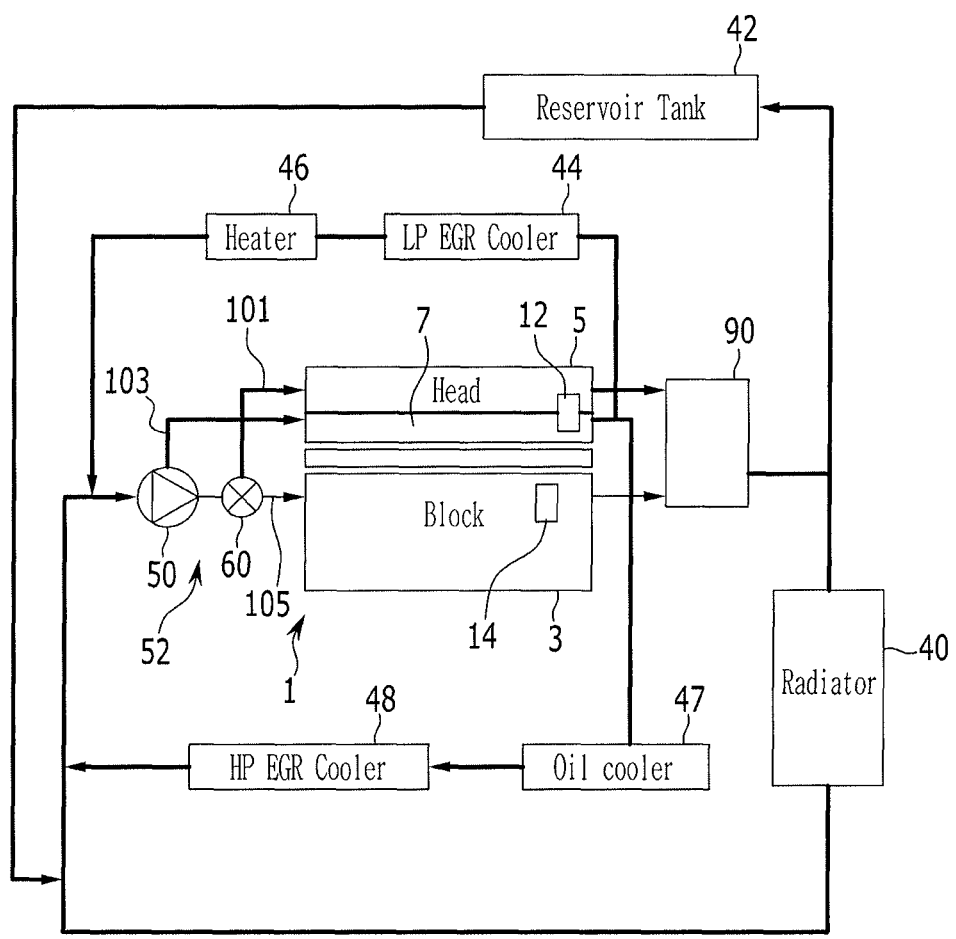
FIG. 6 is a drawing showing an operation of a cooling system in a warm driving condition according to an exemplary embodiment of the present invention.

FIG. 5 is a drawing showing an operation of a coolant flow control apparatus in a warm driving condition according to an exemplary embodiment of the present invention and FIG. 6 is a drawing showing an operation of a cooling system in a warm driving condition according to an exemplary embodiment of the present invention.

Referring to FIG. 5 and FIG. 6, operations of the cooling system according to exemplary embodiments of the present invention in a warm driving condition will be described.

The controller 30 determines whether the outputting signal of the first coolant temperature sensor 12 satisfy a predetermined warm driving condition and if the warm driving condition is satisfied, then the controller 30 controls operations of the driving unit 60 to open the first coolant supply line 55 and to close the second coolant supply line 56.

The predetermined warm driving condition may be preset as the temperature in the lower cylinder head 7 is above 90° C.

In the warm driving condition, the first coolant supply line 55 communicating with the upper cylinder head 5 is opened and the second coolant supply line 56 communicating with the engine block 3 is closed according to the control of the controller 30. That is, as shown in FIG. 5, the electric heater 74 is operated for the valve plate 62 to be opened and for the valve piston 64 to be closed due to the guiding wall 58.

In the warm driving condition, the coolant is transmitted to the upper cylinder head 5 and the lower cylinder head 7 so that knocking may be prevented. However, the coolant is not supplied to the engine block 3 so that temperatures of the engine block 3 may be maintained in relatively high and fuel efficiency may be enhanced.

The coolant flowing through the upper cylinder head 5 is cooled in the radiator 40.

Figure 7:
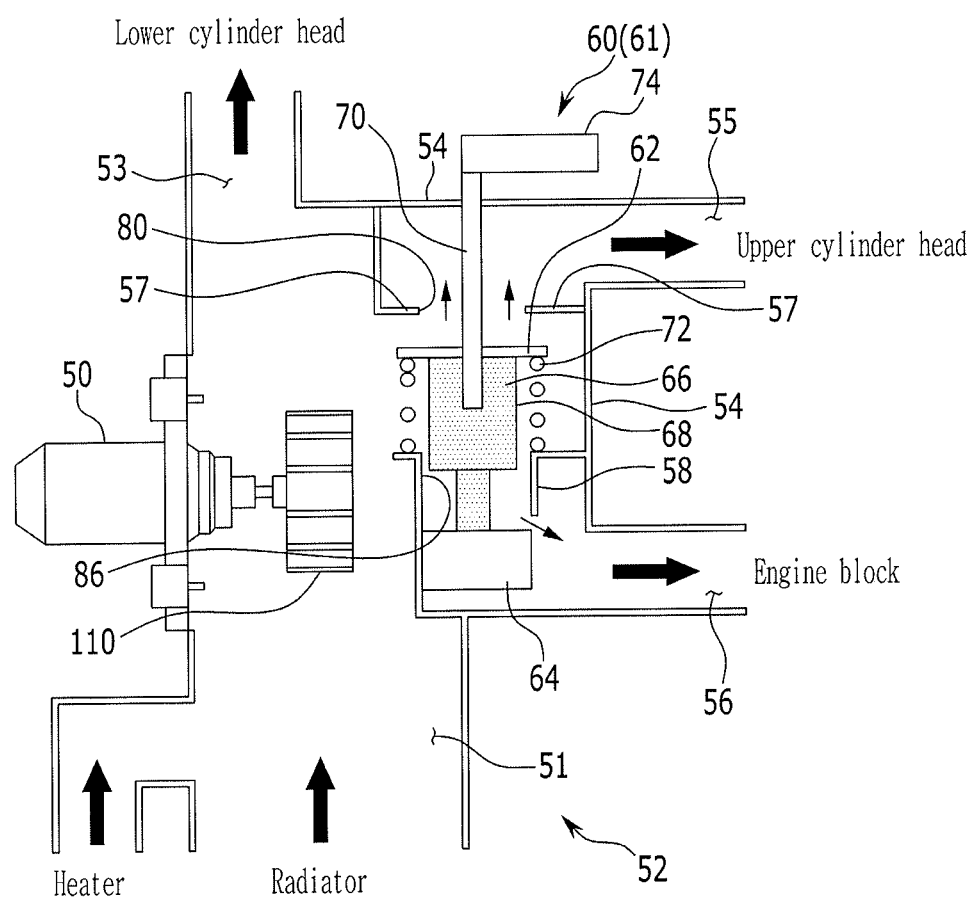
FIG. 7 is a drawing showing an operation of a coolant flow control apparatus in a high temperature driving condition according to an exemplary embodiment of the present invention.
Figure 8:
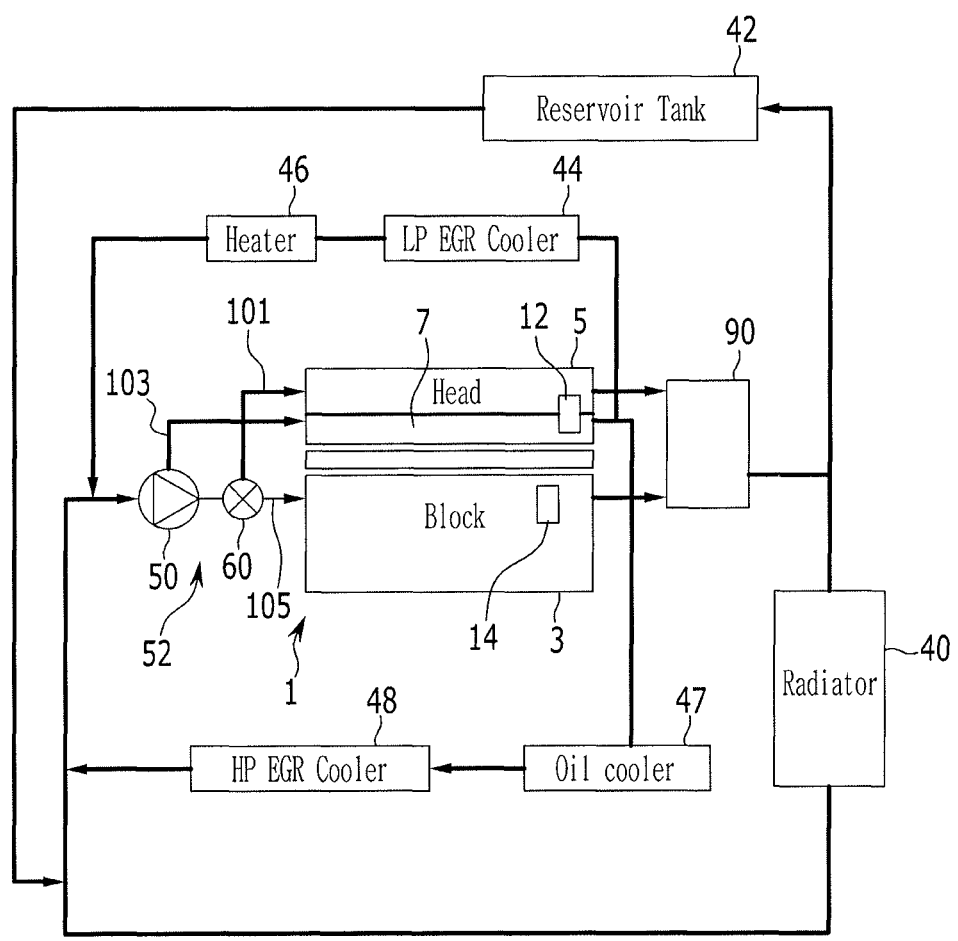
FIG. 8 is a drawing showing an operation of a cooling system in a high temperature driving condition according to an exemplary embodiment of the present invention.

FIG. 7 is a drawing showing an operation of a coolant flow control apparatus in a high temperature driving condition according to an exemplary embodiment of the present invention and FIG. 8 is a drawing showing an operation of a cooling system in a high temperature driving condition according to an exemplary embodiment of the present invention.

Referring to FIG. 7 and FIG. 8, operations of the cooling system according to exemplary embodiments of the present invention in a high temperature driving condition will be described.

The controller 30 determines whether the outputting signal of the second coolant temperature sensor 14 satisfy a predetermined high temperature driving condition and if the high temperature driving condition is satisfied, then the controller 30 controls operations of the driving unit 60 to open the first coolant supply line 55 and the second coolant supply line 56.

The predetermined high temperature driving condition may be preset as the temperature in the engine block 3 is above 105° C.

In the high temperature driving condition, the first coolant supply line 55 communicating with the upper cylinder head 5 and the second coolant supply line 56 communicating with the engine block 3 are opened according to the control of the controller 30. That is, as shown in FIG. 7, the electric heater 74 is operated for the valve plate 62 and the valve piston 64 to be opened.

In the high temperature driving condition, since the coolant are transmitted to the upper cylinder head 5, the lower cylinder head 7 and the engine block 3 simultaneously, so that overheating of the engine 1 may be prevented.

Figure 9:
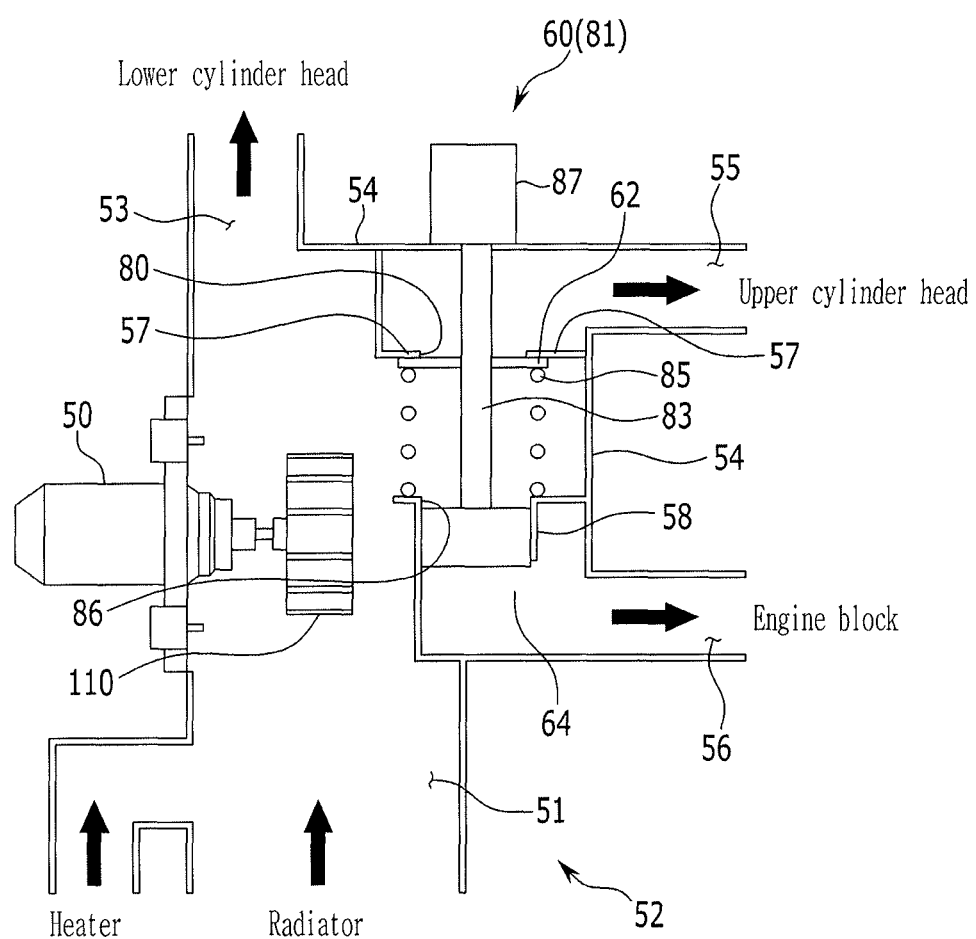
FIG. 9 is a drawing showing a coolant flow control apparatus according to a variant exemplary embodiment of the present invention.

FIG. 9 is a drawing showing a coolant flow control apparatus according to a variant exemplary embodiment of the present invention.

Referring to FIG. 1, FIG. 2, FIG. 3 and FIG. 9, a coolant flow control apparatus according to a variant exemplary embodiment of the present invention will be described.

In description of the coolant pump shown in FIG. 9, the same or similar constituent elements described in FIG. 3 to FIG. 8 will be designated by the same reference numerals and repeated description will be omitted.

The coolant flow control apparatus shown in FIG. 9 includes a driving unit 81(60) provided with a solenoid.

That is, the driving unit shown in FIG. 9 includes an operating rod 83 connected to the valve plate 62 and the valve piston 64, a spring 85 elastically supporting the operating rod 83 and a solenoid 87 connected to the operating rod 83 and selectively moving the operating rod 83.

The controller 30 controls operations of the solenoid 87 according to the output signals of the vehicle operation state detecting portion 10 and the solenoid 87 selectively pushes the valve plate 62 and the valve piston 64 so that the first coolant supply line 55 and the second coolant supply line 56 are closed, the first coolant supply line 55 is opened and the second coolant supply line 56 is closed, or the first coolant supply line 55 and the second coolant supply line 56 are opened.

The coolant flow control apparatus shown in FIG. 9 may be applied to the cooling system and the control method described above, and repeated description will be omitted.

The cold driving condition, the warm driving condition and the high temperature driving condition may be variable according to the output signal of the vehicle operation state detecting portion 10 and thus effective cooling of the cooling system may be enhanced.

For example, in relatively high speed of a vehicle, since atmospheric air may cool the cooling system speed, thus coolant temperature applied to the cold driving condition, the warm driving condition and the high temperature driving condition may be set as relatively high.

Also, if the output signal of the accelerator pedal sensor 20 is relatively high, coolant temperature may be expected to be raised due to increasing load of the engine 1. Thus coolant temperature applied to the cold driving condition, the warm driving condition and the high temperature driving condition may be set as relatively low.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:
1. A coolant flow control apparatus comprising:
 a coolant controller housing including:
  an inlet for coolant to flow in;
  an outlet for the coolant to flow out;
  a first coolant supply line; and
  a second coolant supply line;

a water pump mounted to the coolant controller housing for transmitting the coolant;

a valve plate configured for selectively opening the first coolant supply line;

a valve piston configured for selectively opening the second coolant supply line;

a driving unit selectively moving the valve plate and the valve piston for closing or opening the first coolant supply line and the second coolant supply line respectively; and a controller connected to the driving unit and configured for controlling an operation of the driving unit.

2. The coolant flow control apparatus of claim 1, wherein a guiding wall of which the valve piston is movably disposed within a first opening of the guiding wall is formed at the coolant controller housing.

3. The coolant flow control apparatus of claim 2, wherein the water pump is a mechanical water pump.

4. The coolant flow control apparatus of claim 2,
wherein the water pump is an electric water pump connected to the controller, and
wherein the controller is configured to control an operation of the electric water pump.

5. The coolant flow control apparatus of claim 2, wherein the driving unit including:
a thermostat housing connected to the valve plate and the valve piston and of which wax is filled with;
an elastic member elastically supporting the thermostat housing against the guiding wall;
a guide rod, one end portion of which is slidably engaged with the thermostat housing for guiding a movement of the thermostat housing; and
an electric heater connected to the guide rod and transmitting heat to the wax through the guide rod.

6. The coolant flow control apparatus of claim 5,
wherein the coolant controller housing further includes a partition having a second opening connected to the first coolant supply line,
wherein the guide rod is slidably engaged with the thermostat housing through the second opening, and
wherein the valve plate is configured to selectively contact the partition to close the second opening.

7. The coolant flow control apparatus of claim 2, wherein the driving unit including:
an operating rod connected to the valve plate and the valve piston;
an elastic member elastically supporting the operating rod against the guiding wall; and
an actuator connected to the controller and having a solenoid, wherein the actuator is connected to the operating rod and selectively moves the operating rod according to a signal of the controller.

8. A cooling system comprising:
an engine including an upper cylinder head, an upper line connected to the upper cylinder head and transmitting coolant to the upper cylinder head, a lower cylinder head connected to the upper cylinder head, a lower line connected to the lower cylinder head and transmitting coolant to the lower cylinder head, an engine block connected to the lower cylinder head and a block line connected to the engine block and transmitting coolant to the engine block;
a plurality of heat exchange elements receiving coolant from the lower cylinder head;
a radiator connected to the upper cylinder head and the engine block and receiving coolant from the upper cylinder head and the engine block;

a coolant controller housing of which an inlet receiving coolant from the plurality of heat exchange elements and the radiator, an outlet fluidically-communicating with the lower line, a first coolant supply line fluidically-communicating with the upper line and a second coolant supply line fluidically-communicating with the block line are formed;

a water pump mounted to the coolant controller housing for transmitting the coolant;

a valve plate configured for selectively opening the first coolant supply line;

a valve piston configured for selectively opening the second coolant supply line;

a driving unit selectively moving the valve plate and the valve piston for closing or opening the first coolant supply line and the second coolant supply line respectively;

a vehicle operation state detecting portion including a first coolant temperature sensor detecting a temperature of coolant in the lower cylinder head and outputting a first signal and a second coolant temperature sensor detecting a temperature of coolant in the engine block and outputting a second signal; and a controller connected to the driving unit and the vehicle operation state detecting portion and configured for controlling an operation of the driving unit according to at least one of the first and second signals of the vehicle operation state detecting portion.

9. The cooling system of claim 8, wherein a guiding wall of which the valve piston is movably disposed within a first opening of the guiding wall is formed at the coolant controller housing.

10. The cooling system of claim 9, wherein the water pump is a mechanical water pump.

11. The cooling system of claim 9,
wherein the water pump is an electric water pump connected to the controller, and
wherein the controller is configured to control an operation of the electric water pump.

12. The cooling system of claim 9, wherein the driving unit including:
a thermostat housing connected to the valve plate and the valve piston and of which wax is filled with;
an elastic member elastically supporting the thermostat housing against the guiding wall;
a guide rod, one end portion of which is slidably engaged with the thermostat housing for guiding a movement of the thermostat housing; and
an electric heater connected to the guide rod and transmitting heat to the wax through the guide rod.

13. The coolant flow control apparatus of claim 12,
wherein the coolant controller housing further includes a partition having a second opening connected to the first coolant supply line,
wherein the guide rod is slidably engaged with the thermostat housing through the second opening, and
wherein the valve plate is configured to selectively contact the partition to close the second opening.

14. The cooling system of claim 9, wherein the driving unit including:
an operating rod connected to the valve plate and the valve piston;
an elastic member elastically supporting the operating rod against the guiding wall; and
an actuator connected to the controller and having a solenoid, wherein the actuator is connected to the operating rod and selectively moves the operating rod according to the at least one signal of the controller.

15. A control method for the cooling system of claim 8, including:
   determining, by the controller, when the second signal of the second coolant temperature sensor satisfy a predetermined cold driving condition; and
   controlling, by the controller, operations of the driving unit to close the first coolant supply line and the second coolant supply line when the second signal of the second coolant temperature sensor satisfy the predetermined cold driving condition.

16. The control method of claim 15, further including:
   determining, by the controller, when the first signal of the first coolant temperature sensor satisfy a predetermined warm driving condition; and
   controlling, by the controller, operations of the driving unit to open the first coolant supply line and to close the second coolant supply line when the first signal of the first coolant temperature sensor satisfy the predetermined warm driving condition.

17. The control method of claim 15, further including:
   determining, by the controller, when the second signal of the second coolant temperature sensor satisfy a predetermined high temperature driving condition; and
   controlling, by the controller, operations of the driving unit to open the first coolant supply line the second coolant supply line, when the second signal of the second coolant temperature sensor satisfy the predetermined high temperature driving condition.

* * * * *